United States Patent [19]
Bryant

[11] 3,934,356
[45] Jan. 27, 1976

[54] TEACHING AID FOR AIR CONDITIONING APPARATUS

[75] Inventor: George W. Bryant, Houston, Tex.

[73] Assignee: G. M. Brooks Industries, Inc., Houston, Tex.

[22] Filed: Oct. 10, 1972

[21] Appl. No.: 296,001

[52] U.S. Cl. .................................. 35/13; 35/49
[51] Int. Cl.² .................................. G09B 25/02
[58] Field of Search .......................... 35/13, 49

[56] References Cited
UNITED STATES PATENTS

| | | | |
|---|---|---|---|
| 1,955,962 | 4/1934 | Jones | 35/13 X |
| 3,526,044 | 9/1970 | Dwiggins | 35/13 |
| 3,785,064 | 1/1974 | Thomas, Jr. | 35/13 |

*Primary Examiner*—Wm. H. Grieb
*Attorney, Agent, or Firm*—Donald Gunn

[57] ABSTRACT

For use in teaching a skill for service and repair of heating and air conditioning equipment, a teaching aid which incorporates a closed chamber, preferably insulated, which receives therein the air distribution portion of a heating and air conditioning system. The apparatus utilizes a complete miniaturized refrigerant system which has a sealed compressor unit, an evaporator, a condensor, and the appropriate lines connecting the various components. In the preferred embodiment, a removable skid mounted base supports the condensor and compressor.

18 Claims, 4 Drawing Figures

TEACHING AID FOR AIR CONDITIONING APPARATUS

BACKGROUND OF THE INVENTION

The methods of service, installation, and repair of heating and air conditioning equipment has heretofore been taught on a complete, installed heating and air conditioning system. A typical heating and air conditioning system is often installed in a shop area with a work bench adjacent thereto. A typical 2 or 3 ton heating and air conditioning system might stand as much as 5 or 6 feet in height, and may require a substantial amount of floor space. The equipment must be operable, and requires the use of gas or electrical utilities, the cost of which are not negligable. Instruction on a full-scale heating and air conditioning system of a particular brand often limits the ultimate skills of a student to that particular brand. A student may not be able to transfer his skills to equipment of another manufacturer.

The present invention is intended as a teaching aid to avoid problems such as these and others. The layout of components in the present invention does not have the appearance as those in an installed device. They are located at optimum locations for teaching purposes. The present invention is superior to full-size units installed in a teaching facility. A student may also become familiar with the theory of operation and repair of refrigerators and deep freezers through the use of the present invention because of its design.

The present invention is fully portable and can be carried from place to place. Its power consumption is minimal. Even though it is reduced in scale, it provides all features necessary to provide instructions for a user.

SUMMARY OF THE INVENTION

The preferred embodiment of the present invention incorporates a metal carrying case for a housing, which is insulated along various walls to simulate an air conditioned volume. A skid-mounted removable base supports a sealed compressor unit and condensor unit. Within the cabinet, a small fan circulates air past a heat load, preferably light bulbs or strip heaters, and through the evaporator. The evaporator unit cools the air for further circulation directed by the fan. A thermostat is preferably incorporated.

DESCRIPTION OF THE PREFERRED EMBODIMENT

Figure 1:
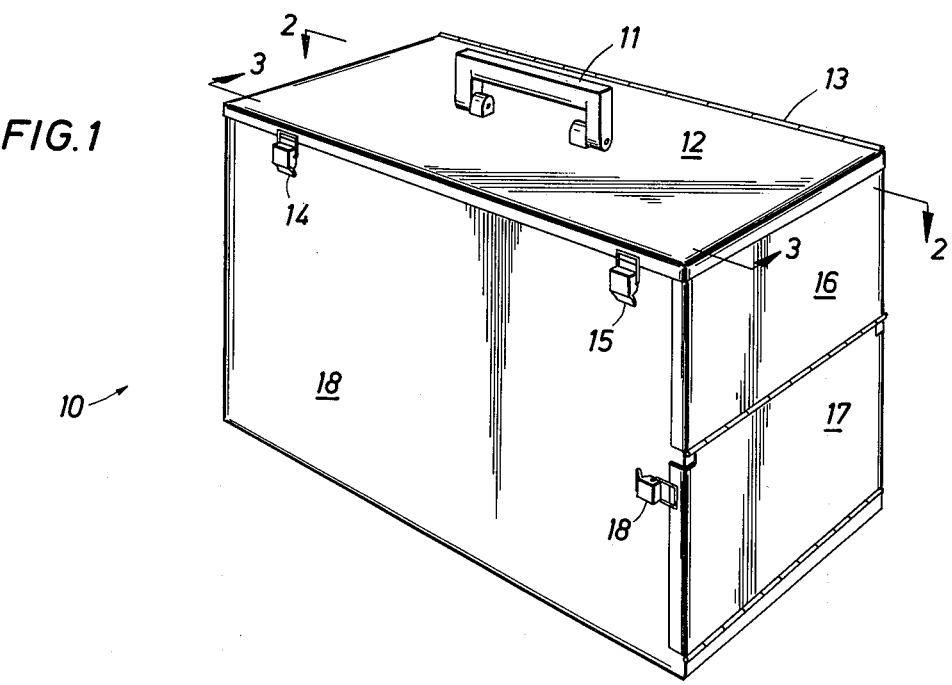
FIG. 1 is a perspective view of the teaching aid of the present invention.

In the drawings, the numeral 10 identifies a carrying case or cabinet for the present invention. Its optimum size is preferably about three feet long, two feet tall, and about sixteen to twenty inches wide. It incorporates a carrying handle 11 which is joined to a lid 12. The lid swings about a piano hinge 13 at one edge. Trunk latches 14 and 15 along the opposite edge close the lid 12. Doors 16 and 17 at one end open to reveal various components as will be described hereinafter. The numeral 18 specifies a trunk latch which closes the door 17. The door 16 extends under the lip of the lid 12 and is closed and held in position by it.

Figure 2:
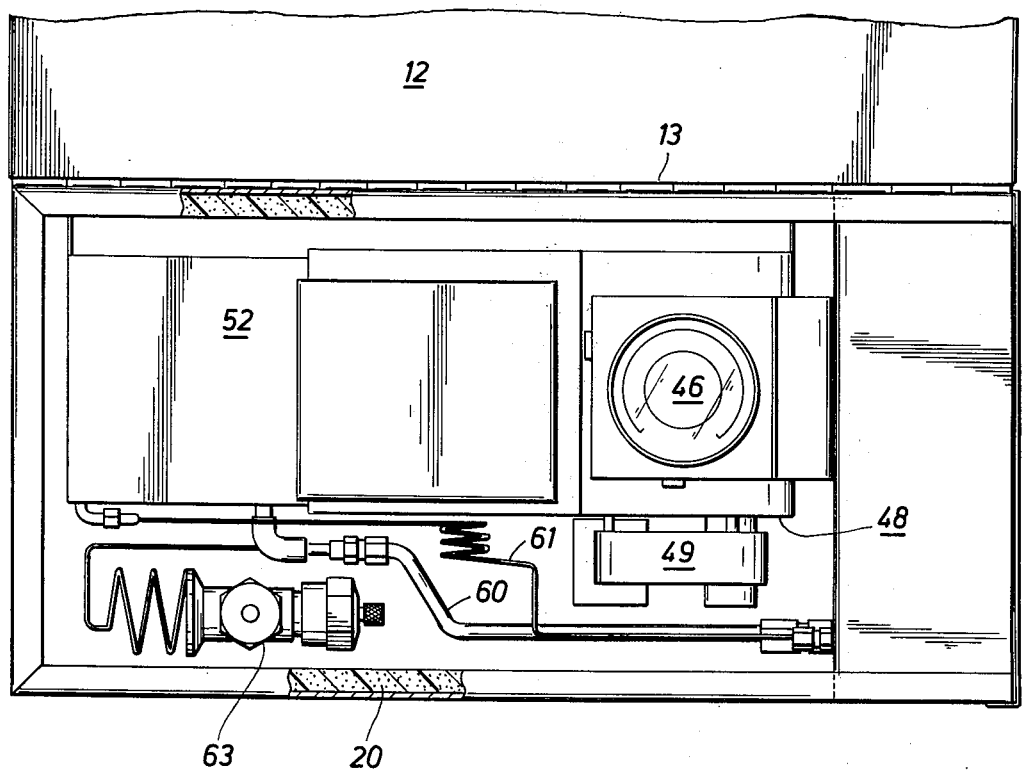
FIG. 2 is a top or plan view showing the lid raised and observing the apparatus within the teaching aid of the present invention.

The housing or container shown in FIG. 1 includes a bottom wall (not shown), sidewalls such as the side 18, and is formed of materials such as stainless steel or aluminum to support the components within. Attention is next directed to FIG. 2 of the drawings which illustrates the housing in greater detail. The numeral 20 identifies a lining of insulation material within the housing. The insulation material assists the teaching aid of the present invention in simulation of a closed chamber such as an air conditioned living space. If desired, the wall can be made of double thicknesses of metal surrounding the insulation material 20, or can be exposed on the interior which is illustrated in FIG. 2. The sides of the housing are not exposed to excessive wear and tear.

Figure 4:
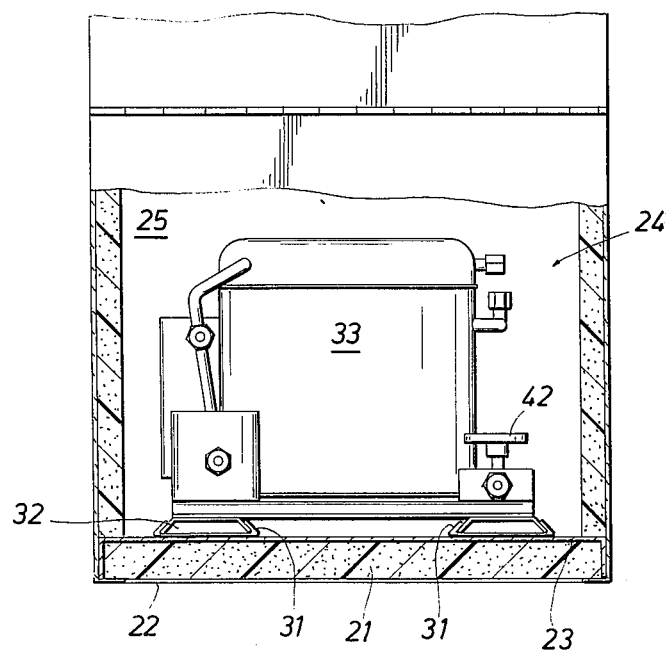

Attention is momentarily directed to FIG. 4 of the drawings which illustrates insulation material 21 at the bottom of the device. The insulation material at 21 is received in double wall construction of parallel plate members indicated at 22 and 23. The floor 23 supports a skid mounted unit generally indicated at 24 which is removable. The skid mounted unit 24 is received within a chamber 25. The chamber is within the housing and serves as a means for storage and transportation of the skid mounted apparatus 24. The apparatus 24 is removed prior to operation. More will be noted concerning this hereinafter.

Figure 3:
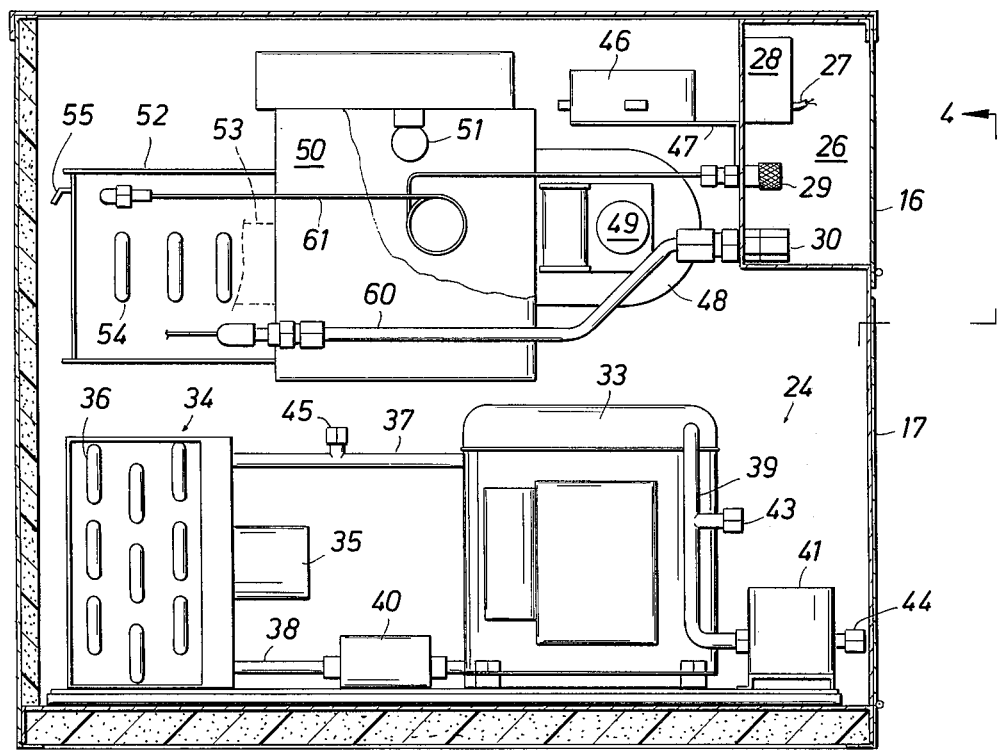
FIG. 3 is a sectional view along the line 3—3 of FIG. 1 showing the arrangement of the components within the carrying case and particularly illustrating the skid mounted base which supports the compressor and condensor units; and, FIG. 4 is a sectional view along the line 4—4 of FIG. 3 showing an end view of the skid mounted unit where it can be removed leaving a volume which simulates a closed chamber to be air conditioned.

Referring momentarily to FIG. 3 of the drawings, a small storage compartment 26 is behind the door 16. When the door 16 is open, the storage compartment 26 is opened. The storage compartment 26 receives the electrical cord for the apparatus which is indicated at 27. The cord 27 is connected to an electrical switch box 28. In addition, the chamber 26 exposes a pair of refrigerant connectors 29 and 30. The refrigerant connectors 29 and 30 communicate with the evaporator unit to be described.

The teaching aid 10 of the present invention includes components which are removed at the time of its operation. It is shown in the drawing assembled for transportation. The skid mounted base 24 is removed at the time of operation. It is removed by opening the door 17 and sliding the skid mount base 24 to the right as viewed in FIG. 3. As shown in FIG. 4, the numeral 31 identifies a pair of tapered slots formed of metal channels attached to the floor 23. The tapered slots 31 receive and engage matching flared channel stock 32 attached at two locations on the base. The base 24 is a generally rectangular frame member which supports the attached equipment. The base 24 thus supports a sealed compressor unit 33 shown in FIG. 4 of the drawings. The base also supports a condensor unit generally indicated at 34 in FIG. 3. The condensor unit 34 includes a small fan motor 35 which directs cooling air past a number of coils 36 in a radiator type arrangement. The coils 36 are received and supported by numerous cooling fins. The fan 35 directs cooling air past the fins to thereby cool the heated refrigerant which is pumped through the condensor unit 34.

The compressor unit 33 is used in the customary manner to compress a gaseous refrigerant. The refrigerant is compressed and leaves the compressor unit as a gas. It is also heated by the compression operation. In accordance with traditional or conventional theory of operation, the heated gaseous refrigerant passes through the condensor unit and surrenders heat to the air, thereby cooling the gas sufficiently to become liquified. It is used in subsequent portions of the equipment in the customary operation of a refrigeration cycle to provide cooling as will be described.

In FIG. 3, the numerals 37, 38 and 39 identify conduits which are arranged between the compressor unit 33 and the condensing unit 34. The conduits 37, 38 and 39 provide the conventional plumbing connections between these components.

The numeral 40 identifies a water filtration trap which removes water from the liquified refrigerant. The numeral 41 identifies a sight glass whereby a service man can observe the condition of the liquified refrigerant. The numeral 42 in FIG. 4 identifies a valve which selectively opens or closes the conduits on the skid mounted unit 24.

The apparatus supported on the skid mounted unit 24 is removed from the chamber. This leaves the chamber evacuated to more properly simulate a refrigerator, a living space to be air conditioned, or the like. Flexible hoses are used to connect from the fittings 29 and 30 recesses in the chamber 26 shown in FIG. 3 and connect with the fittings 43, 44 and 45 as shown in FIG. 3.

The present invention assembles in a manner to provide a complete refrigeration apparatus in that a complete refrigeration cycle is achieved. The refrigerant cycles through all of the equipment required for operation of a refrigeration system. A portion of this equipment is removable from the housing and simulates the typical construction of a living space with air conditioning equipment. A typical living space with air conditioning equipment normally locates the compressor and condensor on the outside where the condenser rejects its heat to atmosphere. A circulation fan and evaporator unit are normally found within the house or living space. The same is also true of a refrigeration system for keeping foods. The present invention is similar in this regard to a conventional refrigerator or deep freeze. Referring again to FIG. 3 of the drawings, the numeral 46 identifies a thermostat which is within the cabinet. Again, the thermostat must be located within a living space for the refrigerator to properly function. The thermostat 46 is supported on a structural frame member 47.

In FIG. 3, a squirrel cage blower assembly 48 includes a motor 49. It draws air in from within the chamber. The air is directed through a closed box 50. The box 50 is a closed chamber or container where air is admitted from the squirrel cage blower 48. The box 50 contains a simulated heat load. In the preferred embodiment, the heat load is a group of light bulbs 51. Two or three light bulbs are normally adequate for simulation purposes. Light bulbs are desirable because the light emitted from them can be used as an indication that the simulated heat load is on. Electric resistance strip heaters can also be installed in the box 50, and provide heat which simulates the heat load used in the teaching aid of the present invention.

An evaporator unit 52 receives air from the box 50 which supports and contains the heat load. The numeral 53 identifies a passage extending from the box 50 into the evaporator unit 52. The evaporator unit 52 includes several coils 54 which are connected to radiator fins which extend into the air flow. The refrigerant pumped through the coils 54 cools the radiator fins sufficiently to draw heat from the air passing over the fins. The evaporator unit is open at its left hand end and a deflector 55 turns air downwardly into the chamber. Tracing the route of travel of the air, it is observed to be drawn from the container or chamber which is comprised of the cabinet of the present invention into the fan 48, through the box 50 where is is selectively and controllably heated by the heat load element 51, and then through the evaporator unit 52. At the evaporator unit, the heated air is cooled and returned to the chamber. The cooled air circulates within the chamber and back through the same cycle, thereby duplicating the circulation of air in a living space, refrigerator or the like.

Just as the air is circulated in simulation of a full scale situation, the liquid refrigerant is circulated in the same manner. Directing attention to FIG. 3, the fittings 29 and 30 connect by means of conduits 60 and 61 to the evaporator unit. The conduit 61 is a capillary tube. Capillary tubes are used to control the extent of temperature drop of the evaporator unit. The capillary tube 61 can be removed from the fittings as shown in FIG. 3 and an expansion valve 63 shown in FIG. 2 can be connected in its stead. Again, expansion valves can be used to control the temperature drop at the evaporator unit. The expansion valve 63 shown in FIG. 2 is for the moment not connected. Suitable quick disconnect fittings are used at both ends of capillary tube 61 to facilitate its installation and removal.

The refrigerant completes a full cycle passing through the compressor unit 33, the condenser unit 34 to surrender its heat to atmosphere, and through the evaporator unit to absorb heat, thereby providing cooled air. The refrigerant is then returned to the compressor unit and the cycle is repeated. The present invention is identical in operation to refrigeration equipment. This measurably aids and assists in the use of the present invention as a teaching aid.

The refrigerant flows along the same channel and is treated and handled in the same manner as in larger equipment. The electrical connections of the present invention are preferably identical to the electrical connections of any refrigeration apparatus. The fan motor 35 for the condensor unit is connected in the same manner as on a larger unit. The thermostat 46 is preferably connected in the customary manner. It turns on the equipment to provide for refrigeration. Many thermostats are equipped with a heater control and the heater element 51 can be used to simulate a gas fired or electric heat source normally found in most air conditioning systems. To the extent that a heating and air conditioning system incorporates electrical distribution wires, relays, switches and the like, they have been omitted from the drawings and reference is made to the conventional wiring arrangement normally used for a heating, refrigeration, or air conditioning system.

In operation, the device of the present invention can be moved readily by one person through the use of the handle 11 in FIG. 1 of the drawings. At the time of use and operation, the door 17 is opened and the skid mounted base 24 is removed. The door 17 is then closed and the trunk latch 18 is closed to keep the door shut. The door 16 is then opened and left open to expose the fittings 29 and 30. Two flexible fluid conduits are connected from the fittings 29 and 30 to the base 24. Three fittings are provided on the base 24. These fittings enable the service man to achieve a number of different connections, and enable him to utilize his test gauges to make the necessary connections for purging of the sytem, filling the system with a refrigerant, and operation of the system in the in the conventional manner. The capillary tube 61 can be used or selectively removed and the expansion valve 63 substituted therefor.

The teaching aid of the present invention is particularly advantageous in that a trainee can observe the operation of all the components within a small area. He does not have to walk around full scale equipment to obtain such observations. The apparatus will simulate the heating and cooling of a house or other living space. Once the connections are made to interconnect the condenser, compressor and evaporator units, the thermostat 46 is set to various and sundry temperature levels. It will then cause the operation of the refrigeration equipment in a conventional or typical refrigeration cycle of cooling. Heating is obtained in the manner previously described through the use of the simulated heat load 51. The heat load 51 will simulate either direct heating, as occurs in winter, or the heat load which requires air conditioning, as in summer.

The present invention may be modified in several regards. A less expensive container can be obtained through the use of an ice chest formed of styrofoam and coated with polyethylene plastic, which are available from many sources. It can be substituted for the more expensive sheet metal and insulated wall construction shown in the preferred embodiment.

Wheels or casters can be placed on the box or cabinet to make it more portable, although this is not believed essential in the least. Further, an insulated divider wall can be placed lengthwise across the apparatus, as viewed in FIG. 3, so that the lower portions of the chamber of the container provides a simulated space to be cooled. In that event, the divider wall would require an opening in communication with the squirrel cage fan 48 to admit air for the cooling cycle and an additional opening at the left hand end where air emerges from the evaporator unit 52 after having been cooled. Also, the thermostat 46 would have to be located below this wall to continue as a means of simulating thermostatic operations.

The foregoing is directed to the preferred embodiment and various alternative arrangements. The scope of the present invention is determined by the claims which follow.

I claim:
1. Training apparatus, comprising:
    a selectively closable portable container for simulating a volume to be air conditioned;
    a refrigerant compressor unit having a refrigerant inlet and outlet;
    a condenser unit connected to the outlet of said compressor unit and having an outlet which is adapted to be connected to supply condensed refrigerant, said condenser unit removing heat from a refrigerant flowing therethrough which heat is expelled remote from the simulated air conditioned volume in said container;
    an evaporator unit in said container adapted to be connected to said condenser unit;
    air moving means in said container for circulating air in said closed container and forcing air through said evaporator unit for cooling by said evaporator unit, said air moving means being selectively rendered operative; and,
    controllable heat load simulation means in said container for heating the air in said container to alter the heat load on the refrigerant circulation system which includes said compressor unit, said condenser unit, and said evaporator unit.
2. The structure of claim 1 further including means for connecting said compressor unit and said condenser unit remote from the interior of said closed container and in communication with said evaporator unit.
3. The structure of claim 1 wherein said closable container serves as a temporary storage container for said compressor unit and said condensor unit.
4. The structure of claim 1 wherein said refrigerant circulation system is operated by a thermostat operatively communicated with air in said closable container.
5. The structure of claim 1 including a top lid which can be opened and closed to expose the interior of said container.
6. The structure of claim 1 including an end lid which can be opened and closed to expose the interior of said container.
7. The structure of claim 1 wherein said refrigerant circulation system incorporates a capillary tube.
8. The structure of claim 1 wherein said refrigerant circulation system incorporates an expansion valve.
9. The structure of claim 1 wherein said closable container has a pair of exposed conduit connectors adapted to be connected with said compressor unit and said condensor unit to thereby define and complete said refrigerant circulation system.
10. The structure of claim 1 wherein said condensor unit incorporates a cooling fan.
11. The structure of claim 1 wherein said compressor unit and condensor unit are mounted on a separate and movable base, means for removably mounting said compressor unit and condensor unit for storage within said container when not in use and for removal therefrom for operation.
12. The structure of claim 11 wherein said base includes a means releasably attaching said base within said container.
13. The structure of claim 12 wherein said means includes a slidably engagable and disengagable means securing said base against movement in two dimensions.
14. The structure of claim 1 wherein said heat load simulation means includes an electric radiant heater means.
15. The structure of claim 1 wherein said container includes an externally mounted carrying handle.
16. The structure of claim 1 including a separable base which receives said condenser unit and said compressor unit thereon.
17. The structure of claim 1 including a water filter in said refrigerant circulation system.
18. The structure of claim 1 including a sight glass in said refrigerant circulation system.

* * * * *